(No Model.)
H. J. GILBERT.
PULLEY.
No. 401,489. Patented Apr. 16, 1889.
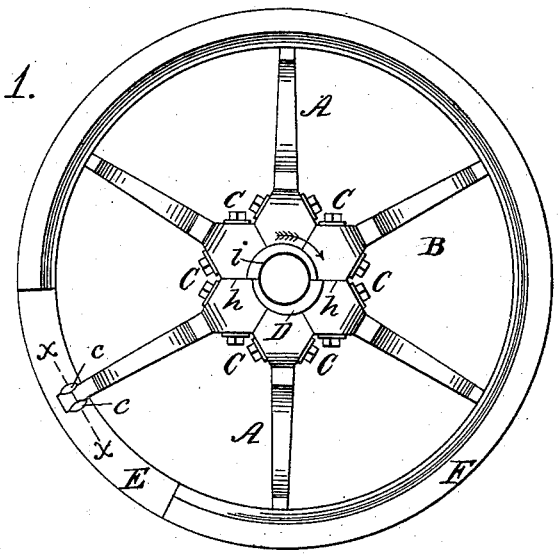
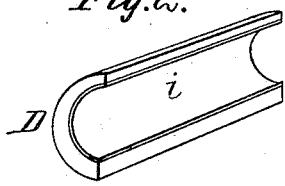
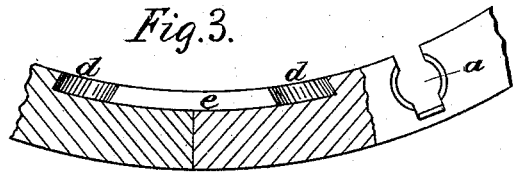
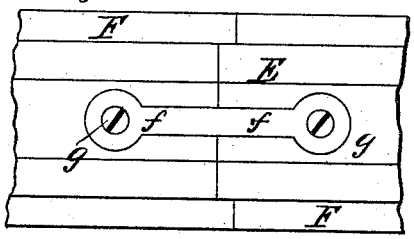
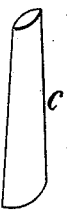
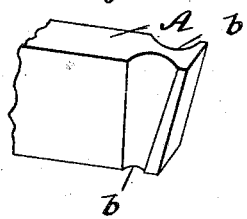
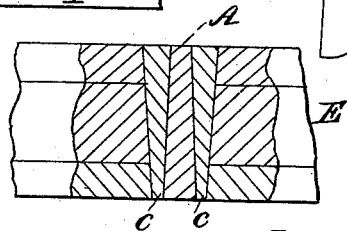
Witnesses:
W. C. Jirdinston.
William Erwin
Inventor:
Henry J. Gilbert
by Peck & Rector
his Attorneys.

UNITED STATES PATENT OFFICE.

HENRY J. GILBERT, OF SAGINAW, MICHIGAN.

PULLEY.

SPECIFICATION forming part of Letters Patent No. 401,489, dated April 16, 1889.

Application filed August 18, 1888. Serial No. 283,142. (No model.)

*To all whom it may concern:*

Be it known that I, HENRY J. GILBERT, a citizen of the United States, residing at Saginaw, in the county of Saginaw and State of Michigan, have invented certain new and useful Improvements in Separable Pulleys, of which the following is a full, clear, and exact description, reference being had to the accompanying drawings, forming part of this specification.

My present invention is an improvement on the construction shown and described in Letters Patent of the United States No. 368,468, granted to me August 16, 1887, and its novelty will be herein set forth, and specifically pointed out in the claims.

In the accompanying drawings, Figure 1 is a side elevation of my improved pulley with a portion of one of its covering-rings removed. Fig. 2 is a perspective view of one half of the two-part bushing or clamping sleeve. Figs. 3 and 4 are enlarged detail views showing the method of securing the two parts of the rim together. Fig. 5 is an enlarged sectional view through the dotted line $xx$ of Fig. 1, showing the method of securing the spoke-tenons to the rim; and Fig. 6 represents one of the tapering wedges used for that purpose. Fig. 7 shows the beveled end of the spoke-tenon for effecting the ready adjustment of the spokes and rim.

The same letters of reference are used to indicate identical parts in all the figures.

In its general construction my improved pulley is similar to that shown in my patent before referred to. There are in this instance six spokes or arms, A, provided with enlarged butts B of the shape shown, which butts have their contiguous faces so beveled as to fit snugly together to form a hub, and are united by bolts C passing through them, as shown.

The inner ends of the butts B are so cut out and shaped as to form two half-circles eccentric to each other and to the center of the pulley, thus making an irregular-shaped shaft-opening, into which is fitted the two-part-cam clamping sleeve or bushing D, whose outer periphery fits snugly in the opening in the hub, and whose inner periphery constitutes a true circle concentric to the center of the pulley.

The ends of the spokes or tenons are arranged to fit in bores $a$ in the two-part rim E, and are secured therein in the following manner: Their outer ends are slightly beveled relatively to a line through the axis of the pulley, as shown in Fig. 7, so that when they are set down in the bores $a$ in the rim they can be easily adjusted and snugly fitted therein. The sides of the tenons are provided with tapering grooves $b$, extending transversely of the rim, and into the openings formed by these grooves and the sides of the bores $a$ are driven the rounded tapering wedges $c$, as seen in section in Fig. 5, thereby firmly securing the tenons in the bores of the rim. The bores $a$ are themselves preferably made tapering, being larger at the side from which the wedges $c$ are driven in to conform to the beveled ends of the spokes and afford more perfectly wedge-shaped openings for said wedges. The outer ends of the spokes A are preferably made somewhat wider than the rim E, so that when the spokes are secured together by the bolts passed through their butts they can be set in the rim and fitted tightly therein by means of their beveled ends, and their surplus width be then dressed off to make a smooth and even finish. The two semicircular parts of the body of the rim are built up of narrow strips in the usual manner, and are secured together by the following means, reference being had to Figs. 3 and 4: The inner face of the rim is provided on opposite side of each of the two joints formed by the union of its two parts, and adjacent thereto, with two shallow bores, $d$, slightly inclined downwardly and outwardly from the joint. These two bores $d$ are connected by a narrow groove, $e$, into which and the bores $d$ snugly fits a metal key or tie-bar shaped to conform thereto. This key is secured in place by screws $g$ passed through holes in its circular ends, and when tightly screwed in place it will, owing to the incline of the bores $d$ and corresponding shape of the ends of the key, draw and firmly bind the ends of the rim together, as will be readily understood. The sides of the rim are covered by suitable rings, F, to connect the fastenings of the spoke-tenons and produce a neat finish. The completed pulley, after being placed upon the shaft, is secured thereto in the following manner: The nuts on the bolts C of the split joint at $h$ are left slack, and the eccentric or cam clamping sleeve or bushing D is turned on the shaft in the direction of the arrow, so as to force the split joints at $h$ slightly open, and the bushing being left in this position the nuts on the bolts C, which pass through said joints, are screwed up until the joints are closed and the pulley firmly bound to the shaft. By this means and in this manner the same pulley may be adjusted to and securely fastened upon shafts of slightly-varying sizes, as will be readily understood.

While the separable cam-clamping sleeve or bushing made simply of wood may be satisfactorily used, I have found it highly advantageous to provide it with an interior lining or binding surface of india-rubber or other flexible material, which gives it a better hold upon the metal shaft than that afforded by the bare wood. This lining, of any suitable material, though preferably of india-rubber, can be applied to the inside of the bushing in any desired manner. In the drawings I have shown it of simple sheet-rubber, $i$, secured to the inner surface of the bushing with glue or other adhesive material.

Having thus fully described my invention, I claim—

1. In a driving-pulley, the combination, with the rim provided with openings for the spoke-tenons, of the spokes having their outer ends beveled relatively to a line through the axis of the pulley to permit their ready adjustment in said rim, substantially as described.

2. In a driving-pulley, the combination, with the rim provided with tapering bores or openings for the spoke-tenons, of the spokes, having their outer ends beveled relatively to a line through the axis of the pulley, and having their tenons provided on their sides with tapering grooves, and wedges adapted to be driven in the openings formed by said grooves and the sides of the bores, substantially as and for the purpose described.

3. In a separable pulley, the combination, with the two-part rim E, provided on its inner surface near each of its two joints with the inclined bores $d$, connected by the grooves $e$, of the metal keys or tie-bars $f$, shaped to conform to said bores and grooves and arranged to be secured therein, substantially as and for the purpose described.

HENRY J. GILBERT.

Witnesses:
EDWARD RECTOR,
WILLIAM IRWIN.